April 10, 1962 R. L. GOLD ETAL 3,028,935
FLUID COOLED FRICTION DEVICE
Filed June 16, 1958 2 Sheets-Sheet 1
FIG.1
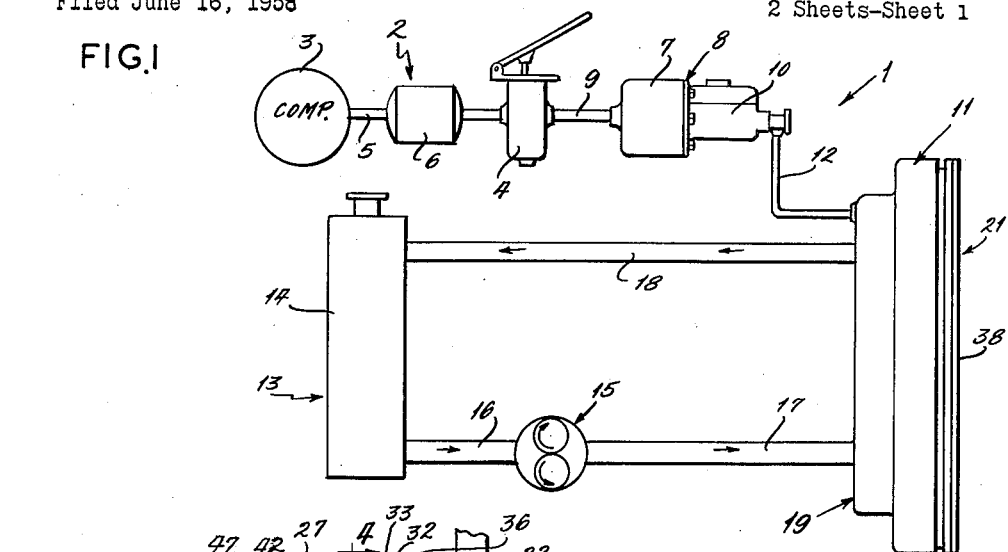
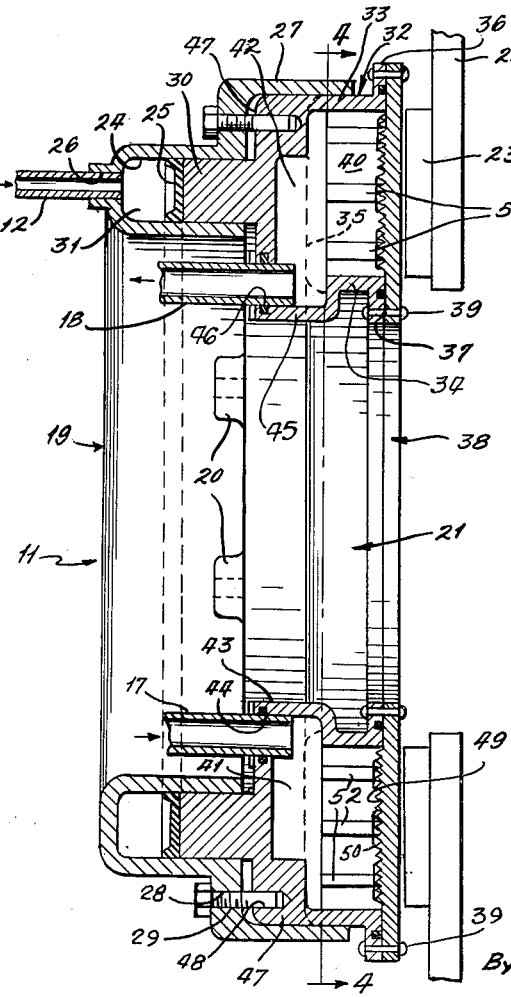
FIG. 2
INVENTORS:
ROBERT L. GOLD
ROBERT E. SCHWARTZ
By Gravely, Lieder & Woodruff
ATTORNEYS.

April 10, 1962   R. L. GOLD ETAL   3,028,935
FLUID COOLED FRICTION DEVICE
Filed June 16, 1958   2 Sheets-Sheet 2
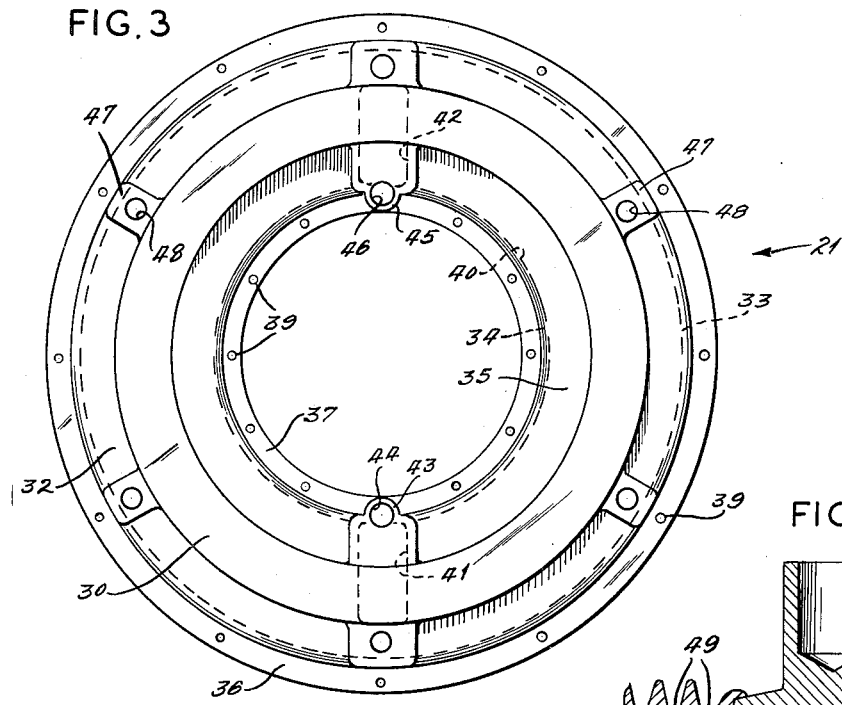
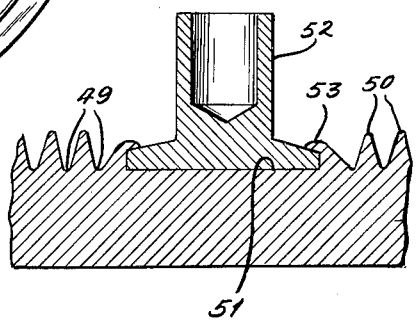
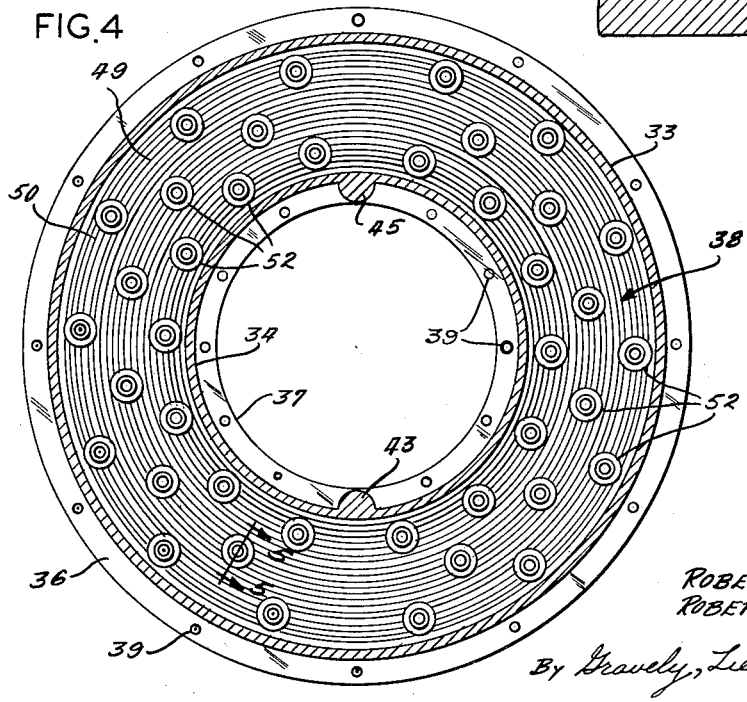
INVENTORS:
ROBERT L. GOLD
ROBERT E. SCHWARTZ
By Gravely, Lieder & Woodruff
ATTORNEYS.

United States Patent Office 3,028,935
Patented Apr. 10, 1962

3,028,935
FLUID COOLED FRICTION DEVICE
Robert L. Gold, Pine Lawn, and Robert E. Schwartz, University City, Mo., assignors to Wagner Electric Corporation, St. Louis, Mo., a corporation of Delaware
Filed June 16, 1958, Ser. No. 742,177
6 Claims. (Cl. 188—264)

This invention relates to braking systems and in particular to a fluid cooled friction device employed therein.

In past braking systems employing fluid cooled brake or friction devices, a fluid was circulated through an annular friction member or piston on one side of a metallic friction element attached thereto; and, when said fluid was pressurized, said annular friction member or piston was actuated to frictionally engage said metallic friction element with a cooperating non-metallic friction material or lining for braking purposes. In other words, the friction devices were cooled by a high rate of pressure fluid flow therethrough and were energized by the restriction or throttling of said pressure fluid flow. The large volume of fluid necessary for cooling interfered with braking control which resulted in erratic braking applications; and, since said fluid was pressurized for braking purposes and also subjected to the intense heat created during a braking application, an undesirable large quantity of expensive, high heat resistant fluid was mandatory.

An object of the present invention is to provide a braking system having a fluid cooled friction device therein which overcomes the abovementioned undesirable features.

Another object of the present invention is to provide a braking system with two separate fluids, one of small volume and adapted for intense pressures to energize the friction device and the other of large volume and relatively small pressures to cool said friction device upon energization.

Another object of the present invention is to present a fluid cooled friction device having a friction piston or member with a relatively large surface for cooling as compared with the surface acted upon by the pressurized fluid.

Still another object of the present invention is to provide a friction piston or member for a fluid cooled friction device having a relatively thin, metallic friction element which is re-enforced to obviate permanent distortion due to intense frictional engagements.

A still further object of the present invention is to provide a fluid cooled friction device having a friction member which enhances "scouring action" of the cooling fluid flow therethrough. "Scouring action" is the term applied to the prevention of the formation of insulating layers of fluid adjacent the cooling surface of the metallic friction plate.

These and other objects and advantages will become apparent hereinafter.

Briefly, the invention is embodied in a brake or frictional device having a friction member with a re-enforced metallic friction element attached thereto whereby said friction member is responsive to an applied fluid pressure of an actuating system to move said metallic friction element into frictional engagement with a cooperating non-metallic friction material or lining and said metallic friction element is cooled by cooling fluid circulated through said friction member from a separate system.

The invention also consists in the parts and in the arrangement and combination of parts hereinafter described and claimed. In the accompanying drawing which forms a part of this specification and wherein like numerals refer to like parts wherever they occur:

FIG. 1 is a diagrammatic view of a brake applying system and brake cooling system having a fluid cooled friction device therein, FIG. 2 is an enlarged cross-sectional view showing the fluid cooled friction device, FIG. 3 is an elevational view of the friction device, FIG. 4 is a cross-sectional view showing a friction element of the fluid cooled friction device taken along line 4—4 of FIG. 2, and FIG. 5 is an enlarged, fragmentary, cross sectional view of the fluid cooled friction element taken along the line 5—5 of FIGURE 4.

Referring now to FIGURE 1 in detail, a brake system 1 is provided with fluid pressure actuating branch 2 comprising compressor means 3 which is connected to the inlet side of an application valve 4 by a conduit 5, said conduit having a reservoir 6 interposed therein. The outlet side of the application valve 4 is connected to an air chamber portion 7 of a power cluster 8 by a conduit 9, and a master cylinder portion 10 of said power cluster is connected to an actuating port of a friction or brake device 11 by a conduit 12. Although an air actuated master cylinder is shown, it is apparent that a manually actuated master cylinder could be employed to displace pressure fluid to the friction device 11. To complete the brake system 1, a cooling branch 13 is provided with a heat exchanger 14 which also serves as a reservoir for cooling fluid; however, a separate reservoir could be employed with said heat exchanger, but for simplicity said heat exchanger is preferred. The heat exchanger 14 is connected to the suction side of pumping means 15 by a conduit 16, said pumping means being driven by the vehicle motor (not shown) or other means as desired; and, the discharge side of said pumping means is connected to the inlet port of the friction device 11 by a conduit 17. The outlet port of the friction device 11 is connected to the heat exchanger 14 by a return conduit 18.

The friction device 11, FIGURE 2, includes an annular housing 19 having a plurality of integrally formed mounting flanges 20 for attachment with a non-rotatable member, such as a vehicle axle flange (not shown), and said housing is adapted to receive an annular friction piston or member 21. The friction device 11 also includes a disc 22 for fixed attachment with a rotatable member, such as a vehicle wheel (not shown) and a non-metallic friction material or lining 23 is carried on said disc in a position to be engaged by the friction member 21 to effect a braking application.

The housing 19 is provided with an annular bore 24 in which is received an annular seal 25 in sealing engagement with the side walls thereof and in abutment with the friction member 21; and, an actuating port 26 which fixedly receives the conduit 12, as previously mentioned, is provided through the end wall of said bore. The housing 19 is also provided with a flange portion 27 integrally formed adjacent the open end of the bore 24 for friction member guiding purposes; and, a plurality of bores 28 are provided in said housing adjacent the periphery of said flange portion having axially extending anchor pins 29 threadedly received therein.

The friction member 21, FIGURES 2 and 3, is provided with an annular plunger 30 which is slidably received in the housing bore 24 having one end thereof in abutment with the annular seal 25; and, in this manner, an expansible actuating chamber 31 for pressure fluid is defined in the housing 19 by the walls of said bore and said plunger in abutment with said seal. The friction member 21 is also provided with an enlarged channel member 32 integrally formed on the other end of the plunger 30 and slidably engageable with the housing flange portion 27. The channel member 32 is C-shaped in cross section having side walls 33 and 34 which are interconnected by a base wall 35. The ends of the side walls 33 and 34 are provided with seal carrying, radially extending flanges 36 and 37, respectively, for sealable engagement with a relatively thin, annular, friction element or plate 38 (to be discussed later) which is fixedly attached thereto by suitable means, such as a plurality of rivets 39. In this manner a flow or circulating chamber 40 for cooling fluid is defined between the base and side walls of the C-shaped channel member 32 and the inner surface of the friction element 38.

The base wall 35 is provided with integral, diametrally opposed recesses 41 and 42 forming inlet and outlet plenum chambers, respectively, in communication with the circulating chamber 40. The base wall 35 is also provided with an integrally formed duct 43 having a seal carrying inlet port 44 therein which connects with the inlet plenum chamber 41; and, another integrally formed duct 45 is also provided in said base wall having a seal carrying outlet port 46 therein which connects with the outlet plenum chamber 42. The inlet and outlet ports 44 and 46 slidably and sealably receive the inlet and return conduits 17 and 18, respectively, of the cooling branch 13, as previously mentioned; however, flexible connections could be fixedly received in said ports and connect with said conduits, but for simplicity the slidable connections between said conduits and ports are preferred. The base wall 35 of the channel member 32 is also provided with a plurality of spaced, integral lugs 47 having anchor pin receiving bores 48 therein which are adapted to align with and slidably receive the anchor pins 29 fixedly positioned in the flanged portion 27 of the housing 19. In this manner, the friction member 21 is axially movable relative to the housing 19, but rotation thereof is prevented by the anchor pins 29.

Referring now to FIGURES 2, 4, and 5, the aforementioned annular friction element 38 is preferably formed of a metal having high heat conductivity properties, such as copper. A plurality of concentric or annular grooves 49 which form fins 50 are provided in the inner surface of the friction element 38 to enhance heat transfer while the outer surface thereof is adapted for frictional engagement with the non-metallic friction material 23 on the disc 22. At predetermined positions about the inner surface of the friction element 38, the fins 50 are faced to provide a plurality of plane surfaces 51. A plurality of re-enforcing supports, such as rivets 52, have one end positioned in the plane surfaces 51 of the friction element 38 and are fixedly attached thereto by suitable means, such as staking or clinching the fins 50 over the heads of rivets 52 as shown at 53, while the other ends thereof are adapted for abutment with the base wall 35 of the channel member 32. The supporting means 52, as shown in FIG. 4, are preferably arranged in radially spaced and radially offset relationship forming a pattern of non-concentricity relative to the axis of the member. Although the small areas of the friction element 38 opposite the inlet and outlet plenum chambers 41 and 42 are unsupported, supporting means could be interposed between the inner surface of said friction element and the wall of said plenum chambers opposite thereto in the same manner as previously described. Thus, these rivets 52 are supported by the base wall 35 of the channel member 32, and the relatively thin friction element 38 is re-enforced intermediate the side walls 33 and 34 to prevent permanent distortion or the collapse thereof during frictional engagement. The presence of the rivets 52 in the circulating chamber 40 induces turbulence or non-laminar flow of the cooling fluid therethrough which serves to "scour" the inner surface of the friction element 38 and prevent the formation of insulating layers of cooling fluid adjacent said inner surface thereby enhancing heat transfer between said friction element and cooling fluid. Of course, the re-enforcing supports could be integrally formed with the friction element 38, but for simplicity, the rivets 52 are preferred.

*Operation*

In the cooling branch 13 of the brake system 1, cooling fluid is continuously pumped from the heat exchanger 14 through the conduit 16 by the pumping means 15 and delivered to the inlet port 44 of the friction member 21 through the conduit 17. The cooling fluid is then circulated through the inlet plenum chamber 41, and the circulating chamber 40 in direct engagement with the inner surface of the friction element 38 at all times and therefrom to the outlet plenum chamber 42 and the outlet port 46. From the outlet port 46, the cooling fluid returns to the heat exchanger 14 via the conduit 17 for re-circulation through the cooling branch 13. Of course, the fluid pressure of the cooling fluid is at all times just great enough to overcome the resistances of the cooling branch 13, but, the volume of flow through said branch is necessarily high in order to dissipate the intense heat generated during a braking application, as will be described hereinafter.

Assuming the reservoir 6 in the actuating branch 2 of the brake system 1 is fully charged by the compressing means 3 when the operator desires to decelerate or make a complete stop, the application valve 4 is actuated to meter fluid pressure at a desired rate through the conduit 9 to the power cluster 8. This fluid pressure actuates the air chamber portion 7 of the power cluster 8 which in turn actuates the master cylinder portion 10 thereof to displace pressure fluid through the conduit 12 into the actuating port 26 and the actuating chamber 31 of the brake housing 19. In this manner, the displaced pressure fluid creates a fluid pressure in the actuating chambe 31 which acts on the effective area of the sealing cup 25 creating a brake applying force which urges the friction member 21 rightward; therefore, the outer surface of friction element 38 is moved into frictional engagement with the friction material 23 on the disc 22 creating a force on said friction element in opposition to the brake applying force. The intense heat generated during this frictional engagement is conducted through the relatively thin friction element 38 and the fins 50 thereof and transferred to the cooling fluid circulating through the circulating chamber 40. The abutting engagement of the re-enforcing rivets 52 between the inner surface of the friction element 38 and the base wall 35 of the channel member 32 serve to oppose the abovementioned force on said friction element due to the frictional engagement in order to prevent permanent distortion or the collapse of said friction element.

When the desired rate of deceleration is attained or the stop completed, the operator releases the application valve 4 thereby exhausting the fluid pressure from the air chamber portion 7 of the power cluster 8 through the conduit 9 and the exhaust port of said application valve. When the air chamber portion 7 is exhausted, the component parts of said air chamber portion and the master cylinder portion 10 of the power cluster 8 return to their original position thereby allowing the displaced actuating pressure fluid to return from the bore 24 of the friction device 11 to said master cylinder portion through the conduit 12. As a result, the fluid pressure in the actuating branch 2 and consequently in the bore 24 of the friction device 11 is alleviated which serves to deenergize said friction device. When the vehicle is again accelerated or placed in motion, the rotation of the disc 22 and friction material 23 kicks or moves the friction member 21 leftwardly in the housing 19 whereby the friction element 38 is disengaged from said friction material or assumes a position of negligible drag relative thereto. Meanwhile, cooling fluid is being circulated through the circulating chamber 40 of the friction member 21, as above described.

It is apparent that the friction device 11 is provided with a separate actuation and circulating chambers 31 and 40 which are connected to separate actuating and cooling branches 2 and 13, respectively, of the brake system 1. A large volume of fluid is required in the cooling branch 13 to dissipate the intense heat created during a braking application, said fluid in said cooling branch being maintained at a very low pressure just great enough to overcome the resistances of said cooling branch; and, a relatively small volume of fluid is required in the actuating branch 2 to energize the friction device 11 at relatively high fluid pressures for a braking application.

From the foregoing, it is apparent that more accurate braking control is attainable since only a relatively small volume of pressure fluid is employed to energize the friction device 11 thereby obviating erratic braking applications. In connection therewith, an inexpensive brake fluid can be employed in the actuating branch 2 since it is not subjected directly to the intense heat created during a braking application; and, a relatively inexpensive cooling fluid, such as water, can be employed in the separate cooling branch 13 which requires a much greater volume of fluid.

It is also apparent that the inner surface of the friction element 38 which defines one surface of the circulating chamber 40 is much greater in area than the surface of the plunger 30 which defines one surface of the actuating chamber 31. This enlarged area of the inner surface of the friction element 38 affords much more efficient cooling for the friction device 11; and, the smaller surface area of the friction member plunger 30 permits a reduction in the size of the actuating means, such as the power cluster 8 and, in particular, the master cylinder portion 10 thereof.

It is also apparent that the very large force created on the outer surface of the friction element 38 during frictional engagement is much greater than the negligible opposing force of the cooling fluid pressure acting on the effective area of the inner surface of said friction plate; however, the re-enforcing supports, or rivets 52, which are interposed between the inner surface of said friction elements and the base wall 35 of the channel member 32 prevent the collapse or permanent distortion of said friction element during a braking application.

In addition, it is also apparent that the rivets 52 in the circulating chamber 40 enhance turbulent flow therethrough which in turn provides a "scouring action" on the inner surface of the friction element 38. This "scouring action" of the turbulent flow prevents the formation of laminar flow layers of cooling fluid adjacent the inner surface of the friction element 38 which greatly interferes with the transfer of heat from said friction plate to the cooling fluid.

It is now apparent that there has been provided a friction device with a friction member having a re-enforced metallic friction element thereon adapted for frictional engagement with a cooperating friction material. The friction member moves the metallic friction element into frictional engagement in response to an applied fluid pressure created in an actuating branch of a brake system, and said metallic friction element is cooled by cooling fluid circulated through said friction member from a separate cooling branch of said brake system.

The foregoing description and accompanying drawings have been presented only by way of illustration and example, and changes and alterations in the instant disclosure, which will be apparent to one skilled in the art, are contemplated as within the scope of the instant invention which is limited only by the claims which follow.

What we claim is:

1. A fluid cooled friction member comprising an open-ended channel having an annular base wall interconnecting axially extending side walls, a metallic friction element interconnecting said side walls to close said open-ended channel and forming a chamber for cooling fluid therewith, means for circulating cooling fluid through said chamber at a relatively low rate of flow, and a plurality of supports arranged circumferentially in the chamber between said base wall and friction element, each of said supports being in radially spaced and offset relation with adjacent supports to support said friction element against distortion inwardly of said chamber and to create a relatively high degree of turbulence in the cooling fluid at the relatively low rate of flow for "scouring" the area of the friction element exposed to cooling fluid in said chamber and substantially obviating static pockets of fluid throughout said chamber.

2. A fluid cooled friction member comprising an annular plunger having an open-ended channel integrally formed on one end thereof, said open-ended channel being defined by a radially extending base wall interconnecting axially extending side walls, a relatively thin annular metallic friction element secured to said side walls to close said open-ended channel and forming a cooling chamber therewith, diametrically spaced plenum chambers integrally formed in said base wall in communication with said chamber, an inlet port in one of said plenum chambers and an outlet port in the other of said plenum chambers to supply cooling fluid to said cooling chamber and discharge cooling fluid therefrom, said friction element having an outer surface adapted for frictional engagement and an inner surface in heat transfer relationship with the cooling fluid in said cooling chamber, and a plurality of spaced supports arranged in a non-concentric pattern throughout said cooling chamber and extending between said inner surface and said base wall to prevent distortion of said friction element inwardly of said chamber, each of said supports dividing the cooling fluid flow therepast between said inlet and outlet ports of said plenum chambers and producing relatively high turbulent, substantially non-laminar flow characteristics at a relatively low rate of flow to substantially obviate the formation of static pockets of fluid throughout said cooling chamber.

3. A fluid cooled friction device comprising first and second relatively rotatable members movable into frictional engagement, said first relatively rotatable member having a housing with an annular bore therein, an annular plunger slidable in said bore and forming a first chamber for pressure fluid therewith, an actuating port in said housing connecting with said first chamber, an open-ended channel integrally formed with said plunger and defined by an annular base wall interconnecting axially extending side walls, an annular relatively thin metallic friction element secured to said side walls to close said open-ended channel and forming a second chamber for cooling fluid flow therethrough, said second chamber being separate from said first chamber, spaced plenum chambers formed in said base wall and in communication with said second chamber, an inlet port in one of said plenum chambers and an outlet port in the other of said plenum chambers to direct the continuous flow of cooling fluid simultaneously in both directions through said second chamber and discharge the flow therefrom, said metallic friction element having an outer surface adapted for heat generating frictional engagement with said second relatively rotatable member and an inner surface in heat conductive relationship with said outer surface, a plurality of concentric fins on said inner surface to increase the heat transfer area thereof, said inner surface and fins being in heat transfer relation with the cooling fluid flow in said second chamber, and a plurality of spaced rigid supports in said chamber extending between said inner surface of said friction element and said opposed wall of said chamber for supporting said friction element against distortion inwardly of said chamber upon frictional engagement of said friction element and other member, some of said supports being in juxtaposition with said side walls and other of said supports being intermediate to said side walls for creating a relatively high degree of turbulence in the cooling fluid to substantially prevent the formation of static pockets of cooling fluid in said chamber to substantially prevent the formation of insulating fluid layers on said inner surface upon frictional engagement of the outer surface of said friction element and said other relatively rotatable member.

4. A fluid cooled friction device comprising a pair of relatively rotatable members movable into frictional engagement, an annular chamber for cooling fluid in one of said members including concentric side walls and a base wall interconnecting said side walls, a metallic friction element secured to said member adjacent said side walls, a cooling surface on said friction element forming one wall of said chamber in opposed relation with said base wall and adapted for heat transfer relation with the cooling fluid in said chamber, a friction surface on said friction element directly opposite said cooling surface and adapted for heat generating engagement with the other of said members, inlet and outlet means in said one member for continuously circulating cooling fluid through said chamber at a relatively low rate of flow and at a relatively low pressure great enough to overcome the resistance of said chamber, and a plurality of pedestal supports positioned in radially spaced and offset relation in said chamber and extending between said base wall and cooling surface to support said friction element against distortion inwardly of said chamber, said supports producing a relatively high degree of turbulence in the cooling fluid flow to substantially prevent the formation of static pockets of cooling fluid in said chamber and to effect a "scouring" action of the cooling fluid against said cooling surface to substantially prevent the formation of an insulating fluid layer thereon upon frictional engagement of said other member and friction element.

5. The method of cooling a friction device having a chamber for cooling fluid with a wall thereof adapted for heat producing frictional engagement comprising continuously circulating cooling fluid at a relatively low rate of flow and at a relatively low pressure through said chamber in heat exchange relation with said wall, and creating a relatively high degree of turbulence in the cooling fluid flow throughout said chamber to substantially obviate the formation of a relatively low conductive heat insulating fluid layer on the area of said wall in heat transfer relation with the cooling fluid in said chamber during frictional engagement and to substantially obviate the formation of static pockets of cooling fluid in said chamber.

6. In a fluid cooled friction member including a chamber for cooling fluid, one wall of said chamber consisting of a metallic friction element having high heat conductivity properties and adapted for heat generating frictional engagement, and means for circulating cooling fluid through said chamber at a relatively low rate of flow, the combination of a plurality of turbulence producing members arranged in spaced and staggered relationship on said one wall and projecting into said chamber therefrom, said members producing a relatively high degree of turbulence in the cooling fluid flow to substantially obviate the formation of static pockets of fluid in said chamber and to effect a "scouring action" on the area of said one wall exposed in said chamber to substantially obviate the formation of an insulating fluid layer thereon during frictional engagement.

References Cited in the file of this patent
UNITED STATES PATENTS

| | | |
|---|---|---|
| 716,278 | Reist | Dec. 16, 1902 |
| 1,131,810 | Zoller et al. | Mar. 16, 1915 |
| 1,536,558 | Bukowsky | May 5, 1925 |
| 1,556,338 | Mangold | Oct. 6, 1925 |
| 1,894,001 | Myers | Jan. 10, 1933 |
| 1,996,194 | Durst | Apr. 2, 1935 |
| 2,051,286 | Boykin | Aug. 18, 1936 |
| 2,664,176 | Whalen | Dec. 29, 1953 |
| 2,747,702 | Van Zelm | May 29, 1956 |
| 2,821,271 | Sanford | Jan. 28, 1958 |
| 2,821,273 | Sanford et al. | Jan. 28, 1958 |
| 2,880,823 | Sedergren | Apr. 7, 1959 |
| 2,889,897 | Sanford et al. | June 9, 1959 |
| 2,934,178 | Eaton | Apr. 26, 1960 |

FOREIGN PATENTS

| | | |
|---|---|---|
| 701,725 | Great Britain | Dec. 30, 1953 |